May 17, 1932.  W. E. SLOAN  1,858,470
FLUSH VALVE
Filed April 28, 1924
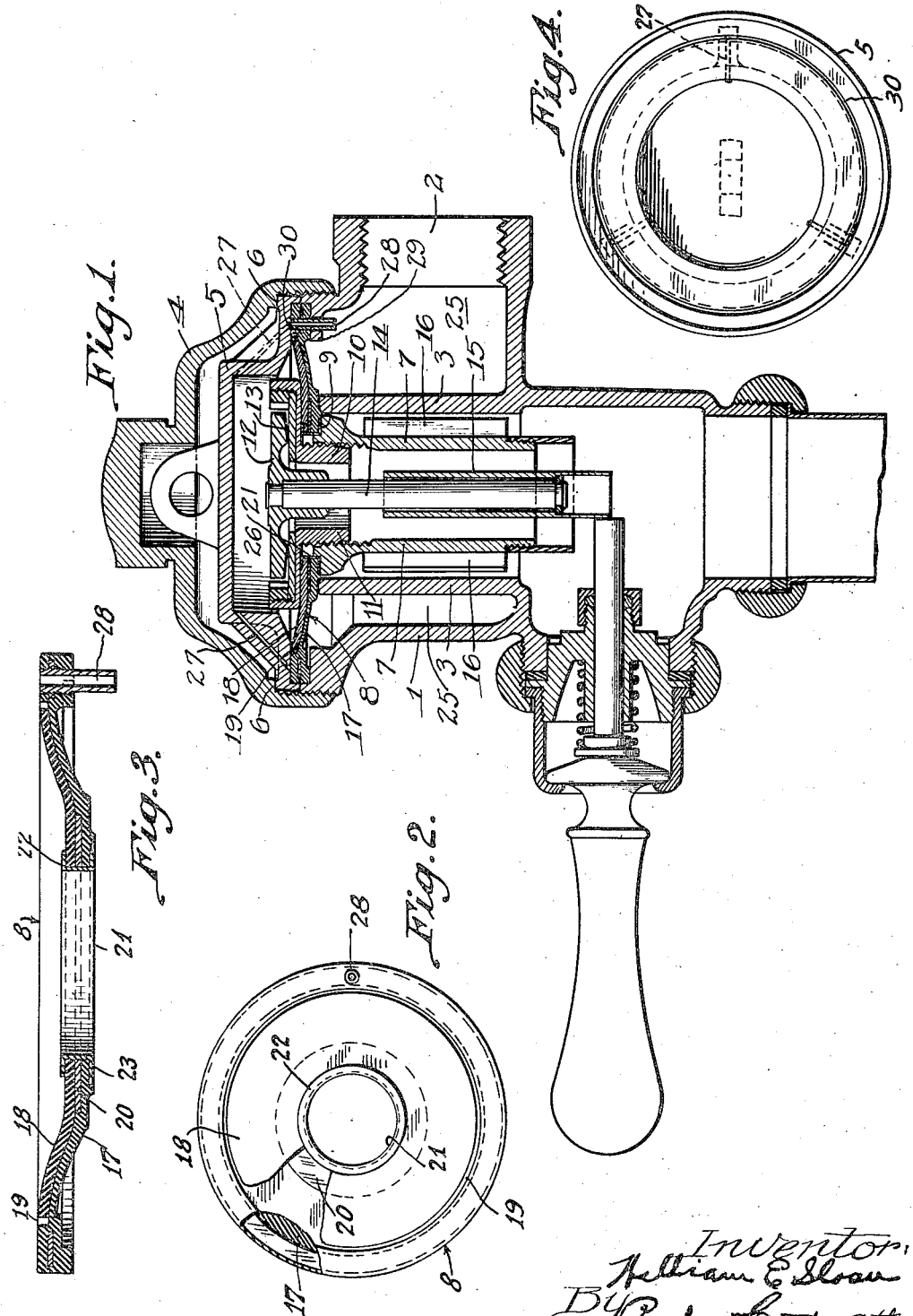

Patented May 17, 1932

1,858,470

UNITED STATES PATENT OFFICE

WILLIAM E. SLOAN, OF CHICAGO, ILLINOIS

FLUSH VALVE

Application filed April 28, 1924. Serial No. 709,362.

This invention relates to flush valves and has for its object to provide a new and improved device of this description. The invention has as a further object to provide means for preventing noise during the closing of the valve. The invention has as a further object to provide a flush valve wherein there is extreme pliability for ease of opening and closing. The invention has as a further object to provide a flush valve which will operate at any desired pressure including low pressures. The invention has as a further object to provide a flush valve which shall be of comparatively simple and cheap construction and at the same time free from trouble in service. The invention has further objects which are more particularly pointed out in the following description.

Referring now to the drawings:

Fig. 1 is a sectional view showing one form of the flush valve embodying the invention.

Fig. 2 is a plan view of the diaphragm of the valve.

Fig. 3 is an enlarged sectional view through the diaphragm of the valve.

Fig. 4 is a view of the interior cover as seen from beneath.

Like numerals refer to like parts throughout the several figures.

Referring now to the drawings, I have shown a flush valve having a casing 1 with an admission opening 2 through which the water enters. Within the casing is a cylindrical portion 3, the upper end of which acts as a valve seat. Connected with the casing 1 is a removable cap 4 and within the removable cap is an inside cover 5, said cover having a shoulder 6 which is engaged by a shoulder on the cap when the cap is screwed down, as clearly shown in Fig. 1. Within the casing is a guide 7 which fits into and is guided by the cylindrical portion 3. The main valve of the flush valves is connected with this guide and consists of a diaphragm 8 having a central opening therethrough and which is clamped between a shoulder 9 on the guide 7 and a member 10 which also has an opening therethrough and which is provided with a sleeve 11 having a screw threaded engagement with the guide 7. An auxiliary valve 12 is provided, which when closed engages the upper surface of the member 10 or a packing member 13 associated therewith. The auxiliary valve is provided with a stem 14 which projects through the opening in the member 10 into the guide 7. This stem is provided with a sliding sleeve 15 which projects beyond the end of the stem and is freely slidable therealong but is prevented from becoming disengaged from the stem. The guide 7 as herein shown is provided with a series of lateral projections or wings 16 which are interposed between the main body of the guide and the inner wall of the cylindrical portion 3. These wings are made so as to provide a loose fit of the guide in the cylindrical portion 3. With the ordinary diaphragm it was necessary to have a very close fit between these wings and the inner face of the cylindrical portion 3 or otherwise the valve would rattle when operated. When a loose fit of the guide is provided some means must also be provided for preventing this noise when the valve is operated. I have provided such means in the present case in the construction of the diaphragm 8. In this construction the diaphragm is provided with a lower section 17 of soft rubber which makes a water tight connection. Some means is provided for giving this soft rubber sufficient rigidity to prevent lateral movement of the guide 7 and yet arranged so it will retain sufficient flexibility to have the proper action. In the construction shown I have provided a stiffening element 18 which is connected with the diaphragm and which acts to give it sufficient rigidity and yet not interfering with its flexibility. This stiffening element may be of any suitable construction, for example it may be made of firm rubber, or it may be made of other material, the requirement being that it shall give sufficient lateral rigidity and yet not interefere with the flexibility of the diaphragm in its operation. The stiffening element 18, as shown herein, consists of a firm rubber section and the soft rubber diaphragm is recessed to receive it. There is preferably a space 19 between the stiffening element 18 and the diaphragm section 17 so as to accommodate the parts to the bending of the diaphragm and permit the easy bending without interference. As shown in Fig. 3, the diaphragm 8 is made up of the soft rubber section 17 which is preferably provided with a metal ring 20 embedded in the rubber, the stiffening element 18 being placed on the top and the several elements being held together by a sleeve 21 which passes through the central opening and has its upper and lower edges 22 and 23 bent under to clamp the parts. Some means is provided for preventing the element 10 from being screwed into the guide too far so as to exert too great a compression on the diaphragm. The metal sleeve 21 in this construction performs this function, as it takes the clamping pressure, being located between the elements 10 and the shoulder 9 on the guide 7. The diaphragm divides the interior of the valve into two chambers 25 and 26 and there is a passageway of comparatively small sectional area between the two chambers. This passageway consists in part of a passageway 27 in the interior cover 5 and a tube 28 which extends through the diaphragm 8. In the present construction this tube fits into the diaphragm and is as it were a part of the diaphragm having a roughened outer face to cause it to make a tight fit with the diaphragm. The lower end of this tube passes loosely through a ledge 29 of the casing 1. The inner cover 5 is provided with a groove 30 which preferably extends entirely around the bottom of the cover and which communicates with the passageway 27. The tube 28 connects with this groove 30 so that water can pass from the chamber 25 through the tube 28 and into the groove 30 and thence by passageway 27 into the chamber 26 so that water may pass up into the upper chamber to equalize the pressure in the two chambers. There may be a plurality of the passageways 27 if desired. The groove 30 makes it unnecessary to place the inside cover in any particular position when assembling the valve because whatever its position the tube 28 will connect with it and thus the equalizing connection will be made between the chambers 25 and 26. The tube 28 is a part of the diaphragm, that is it is tight in the diaphragm and loose in the casing, so that when the diaphragm is removed the tube is removed with it. This is advantageous in the manufacture as it makes it unnecessary to have an accurate fit of the tube into the casing. It also makes it easy to inspect and clean the tube and change it when necessary as the tube can be easily removed from the diaphragm by applying pressure to the end thereof. Since the tube projects from the bottom of the diaphragm, the roughened portion of the tube being at the top end, it will be seen that this also makes it impossible to place the diaphragm wrong side up in assembling the valve.

I claim:

1. In a valve comprising a casing having a passageway therethrough, a hollow cylindrical portion in said casing, a flexible diaphragm extending across the casing and dividing it into two chambers, and a guide connected with said diaphragm and loosely fitting into said hollow cylindrical part, the herein described improved diaphragm made up of two sections, said sections having central openings and a binding device through the central openings for holding together the two sections of the diaphragm, one of the sections being recessed to receive the other section whereby a rattling engagement between said guide and said cylindrical portion during the closing movement of the valve is prevented.

2. In a valve comprising a casing having a passageway therethrough, a hollow cylindrical portion in said casing, a flexible diaphragm extending across the casing and dividing it into two chambers, and a guide connected with said diaphragm and loosely fitting into said hollow cylindrical part the herein described improved diaphragm made up of two sections, said sections having central openings and a binding device through the central openings for holding together the two sections of the diaphragm one of the sections being recessed to receive the other section, said latter section being smaller in diameter than the other section whereby a rattling engagement between said guide and said cylindrical portion during the closing movement of the valve is prevented.

3. In a valve comprising a casing having a passageway therethrough, a hollow cylindrical portion in said casing, a flexible diaphragm extending across the casing and dividing it into two chambers, and a guide connected with said diaphragm and loosely fitting into said hollow cylindrical part the herein described improved diaphragm made up of two sections, one of said sections being smaller in diameter than the other, the section of larger diameter being recessed to receive the smaller section whereby a rattling engagement between said guide and said cylindrical portion during the closing movement of the valve is prevented.

4. A valve comprising a casing having a passageway therethrough, a hollow cylindrical portion in said casing, a diaphragm extending across the casing and dividing it into two chambers, a centrally located opening through said diaphragm, a guide connected with said diaphragm and loosely received in said hollow cylindrical portion, an auxiliary valve mounted on said diaphragm, a flexible stiffening device connected with said diaphragm whereby it is given sufficient lateral rigidity and the noise due to the pounding of said guide against said hollow cylindrical portion when the valve is operated is prevented.

5. A valve comprising a casing having a passageway therethrough, a hollow cylindrical portion in said casing, a diaphragm extending across the casing and dividing it into two chambers, a centrally located opening through said diaphragm, a guide connected with said diaphragm and loosely received in said hollow cylindrical portion, an auxiliary valve mounted on said diaphragm, a flexible stiffening device connected with said diaphragm whereby noise due to the pounding of said guide against said hollow cylindrical portion when the valve is operated is prevented, said flexible stiffening device having an opening which registers with the opening in the diaphragm, and a metal connecting device connecting them together at the points, said metal connecting device acting to prevent undue compression of the diaphragm and stiffening device when pressure is exerted thereto.

Signed at Chicago, county of Cook and State of Illinois, this 12th day of April, 1924.

WILLIAM E. SLOAN.